(12) United States Patent
Halasa et al.

(10) Patent No.: US 7,528,186 B2
(45) Date of Patent: May 5, 2009

(54) SILICA REINFORCED RUBBER COMPOSITION CONTAINING AN IONIC COMPOUND AND ARTICLE HAVING A COMPONENT THEREOF

(75) Inventors: Adel Farhan Halasa, Bath, OH (US); Wen-Liang Hsu, Cuyahoga Falls, OH (US); Aaron Scott Puhala, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 153 days.

(21) Appl. No.: 11/455,608

(22) Filed: Jun. 19, 2006

(65) Prior Publication Data

US 2007/0293610 A1 Dec. 20, 2007

(51) Int. Cl.
*C08K 5/3445* (2006.01)
*C08K 5/17* (2006.01)
*C08K 5/50* (2006.01)
*C08K 5/3432* (2006.01)
*B60C 5/00* (2006.01)

(52) U.S. Cl. ............... 524/106; 524/236; 524/251; 524/104; 524/99; 524/154; 524/492; 524/495; 152/209.1

(58) Field of Classification Search ............. 525/331.9; 524/105, 154, 251, 236, 106, 104, 99, 492, 524/495; 152/209.1
See application file for complete search history.

(56) References Cited

U.S. PATENT DOCUMENTS

| | | | |
|---|---|---|---|
| 4,602,052 A * | 7/1986 | Weber et al. ............... 523/215 |
| 4,861,842 A * | 8/1989 | Cohen et al. ............. 525/329.3 |
| 5,942,069 A | 8/1999 | Gerresheim et al. ....... 156/128.1 |
| 6,025,428 A * | 2/2000 | Day ............................ 524/492 |
| 6,340,511 B1 * | 1/2002 | Kanbe et al. ............. 428/36.91 |
| 6,476,115 B1 * | 11/2002 | Wideman et al. ........... 524/492 |
| 6,623,659 B2 | 9/2003 | Munson et al. ............. 252/184 |
| 6,727,311 B2 * | 4/2004 | Ajbani et al. ............... 524/447 |
| 6,774,240 B2 | 8/2004 | Seddon et al. ........... 548/237.1 |
| 6,828,062 B2 | 12/2004 | Lu et al. ..................... 429/213 |
| 6,924,341 B2 | 8/2005 | Mays et al. ................... 526/89 |
| 6,969,693 B2 | 11/2005 | Sauvage et al. ............. 502/159 |
| 6,984,605 B2 | 1/2006 | Hope et al. ................. 502/164 |
| 6,991,718 B2 | 1/2006 | Moulton ..................... 205/413 |
| 7,053,232 B2 | 5/2006 | Moulton ..................... 556/174 |
| 2004/0112490 A1 * | 6/2004 | Sandstrom ............... 152/152.1 |
| 2005/0143499 A1 * | 6/2005 | Aoki et al. .................... 524/86 |
| 2006/0079704 A1 | 4/2006 | Lacombe et al. ............ 554/124 |
| 2006/0100323 A1 | 5/2006 | Schmidt et al. ............. 524/106 |
| 2006/0128868 A1 * | 6/2006 | Martter et al. .............. 524/492 |
| 2006/0173115 A1 * | 8/2006 | Fudemoto et al. ........... 524/445 |

* cited by examiner

*Primary Examiner*—Vasu Jagannathan
*Assistant Examiner*—Rip A. Lee
(74) *Attorney, Agent, or Firm*—Henry C. Young, Jr.

(57) ABSTRACT

This invention relates to a silica reinforced rubber composition containing an ionic compound and article having a component thereof. The invention particularly relates to an article such as a rubber tire having a component of such rubber composition. Said ionic compound is composed of a combination of an organic cation moiety and an organic or inorganic anion moiety. Said ionic compound is desirably an ionically conductive ionic compound. The invention particularly relates to improvement of one or more physical properties of a rubber composition by an inclusion of such ionic compound and/or providing a path of least electrical resistance for a electrically resistive component of an article such as a tire by an inclusion in the rubber composition of said component of an ionically conductive ionic compound composed of a combination of an organic cation moiety and an organic or inorganic anion moiety.

9 Claims, No Drawings

SILICA REINFORCED RUBBER COMPOSITION CONTAINING AN IONIC COMPOUND AND ARTICLE HAVING A COMPONENT THEREOF

FIELD OF THE INVENTION

This invention relates to a silica reinforced rubber composition containing an ionic compound and article having a component thereof. The invention particularly relates to an article such as a rubber tire having a component of such rubber composition. Said ionic compound is composed of a combination of an organic cation moiety and an organic or inorganic anion moiety. Said ionic compound is desirably an ionically conductive ionic compound. The invention particularly relates to improvement of one or more physical properties of a rubber composition by an inclusion of such ionic compound and/or providing a path of least electrical resistance for a electrically resistive component of an article such as a tire by an inclusion in the rubber composition of said component of an ionically conductive ionic compound composed of a combination of an organic cation moiety and an organic or inorganic anion moiety.

BACKGROUND OF THE INVENTION

Pneumatic tires typically have a circumferential rubber tread with an outer running surface intended to be ground contacting. The tire tread may be of a cap/base construction comprised of an outer rubber tread cap layer having a running surface and an underlying rubber tread base layer. Such tread cap/base layered construction is well known to those having a skill in such art.

In practice, the tread intended to be ground contacting (containing the running surface) may be comprised of an electrically resistive, or insulating, (poorly electrically conductive) rubber composition and said tread base layer comprised of a relatively electrically conductive rubber composition (relative to the rubber composition of said tread cap layer). Such electrically resistive tread may, for example, electrically resistive in the sense of a silica reinforced rubber composition which contains less than about 25 parts by weight per 100 parts by weight rubber (phr) of rubber reinforcing carbon black.

In such instance, it may be desired to provide a path of least electrical resistance through such electrically resistive tread to the running surface of said tread cap layer to enable an electrical discharge of electrical potential generated by the associated vehicle through the wheel on which the tire is mounted.

For, example, numerous proposals involving a physical path of least electrical resistance has been may be provided through or around an electrically resistive rubber tread to its running surface by an electrically conductive rubber strip containing, for example, at least 40 parts by weight per 100 parts by weight (phr) of rubber reinforcing carbon black. Exemplary of such proposals, which is not intended herein to be limited or all-inclusive, is for example, U.S. Pat. No. 5,942,069.

For this invention, an improvement, which is intended to be a significant departure from such past practice, is an inclusion of an ionic compound, particularly an ionically conductive ionic compound, in the otherwise electrically resistive tread rubber composition which contains, for example, less than 25 phr of rubber reinforcing carbon black. It is contemplated that such inclusion would obviate use of a physical insertion of a an electrically conductive rubber strip through or around the tread for such purpose. In this manner, then the tread itself becomes the path of least electrical resistance to its outer running surface without necessitating and therefore to an exclusion of an electrically conductive strip through or around the tread itself to its running surface.

While the mechanism might not be entirely understood, it is contemplated than an inclusion of the ionic compound in a from of an ionically conductive ionic compound within such tread rubber composition acts to provide a path of least electrical resistance by permitting a migration of electrical potential generated ions within the ionic compound toward the running surface of the tread and thence to the ground which contacts the tread running surface.

Further, while the mechanism might not entirely understood, it is alternatively contemplated that an inclusion of the ionic compound in a rubber composition which contains reinforcement in a form of a combination of precipitated silica and rubber reinforcing carbon black can act to improve one or more physical properties of the rubber composition such as, for example, one or more of Shore A hardness, hot rebound and tan delta properties.

In the description of this invention, the term "phr" relates to parts by weight of an ingredient per 100 parts by weight of rubber, unless otherwise indicated.

The terms "rubber" and "elastomer" may be used interchangeably unless otherwise indicated. The terms "vulcanized" and "cured" may be used interchangeably unless otherwise indicated. The terms "compound" and "rubber composition" may be used interchangeably unless indicated. The term "carbon black" is used to refer to rubber reinforcing carbon blacks unless otherwise indicated. Exemplary rubber reinforcing carbon blacks may be referred to, for example, in the *Vanderbilt Rubber Handbook* (1978) on Pages 414 through 417.

DISCLOSURE AND PRACTICE OF THE INVENTION

In accordance with this invention, a rubber composition is provided comprised of, based upon parts by weight per 100 parts by weight rubber (phr):

(A) at least one conjugated diene-based rubber;

(B) about 15 to about 120 phr of reinforcement comprised of precipitated silica of a combination of precipitated silica and rubber reinforcing carbon black, (e.g. less than 25 phr or rubber reinforcing carbon black), and (C) an ionic compound (e.g. from about 1 to about 20 phr thereof), comprised of an organic salt containing an organic cation moiety and an organic or inorganic anion moiety, (wherein said ionic compound is desirably an ionically conductive compound.

In further accordance with this invention an article such as a pneumatic rubber tire is provided having a component of a rubber composition comprised of such rubber composition.

In further accordance with this invention, said tire component is selected from a circumferential tire tread and a tire sidewall, particularly a circumferential tire tread.

Such ionic compound is an organic ionic salt comprised of an organic cation moiety and an anion moiety which may be an organic anion moiety or an inorganic anion moiety, all in the same compound and in the absence of a solvent. While such ionic compounds, or liquids, have been suggested for many purposes, the use of such ionic liquids in a rubber component for a tire, particularly an electrically resistive rubber tire tread or tire sidewall, is considered herein to be a significant departure from past practice.

As hereinbefore indicated, it is particularly desirable that such ionic compound is an ionically conductive ionic compound.

While the ionic compound might be sometimes referred to as an "ionic liquid" it is contemplated that that the ionic compound may be a liquid material at a temperature up to about 200° C., more preferably up to about 180° C., although optionally in a form of a solid, or semi-solid at room temperature (e.g. 23° C.), so that, if desired, it may be introduced as a solid instead of a liquid in the mixing process for the rubber composition in its solid state. Alternatively, a liquid ionic compound may be introduced into the rubber composition as a composite comprised of the liquid ionic compound and a particulate solid carrier.

Representative of various ionic compounds, particularly ionic liquids, including their preparation and uses may be found, for example, and for which is not intended to exhaustive or limiting, U.S. Pat. Nos. 6,623,659, 6,774,240, 6,828,062, 6,924,341, 6,969,693, 6,984,605, 6,991,718 and 7,053,232 and U.S. Patent Application Nos. 2006/0079701 A1 and 2006/0100323 A1.

For this invention, inclusion of such ionic compound into a rubber composition has been observed to reduce its electrically resistivity (for an electrically resistive rubber composition made electrically resistive by having only a minimal amount, if any of rubber reinforcing carbon black) and/or enhance one or more of its physical properties.

Alternatively, or in addition, inclusion of the ionic compound into a rubber composition containing reinforcement in a from of a combination of precipitated silica and rubber reinforcing carbon black has been observed to improve at least one of its physical properties.

In particular, inclusion of such ionic compound into a rubber composition which otherwise has a high electrical resistivity (e.g. a rubber composition containing only a minimal amount of rubber reinforcing carbon black, if any, of for example less than about 25 phr thereof) has been observed to provide a reduced electrical resistivity and therefore is considered herein as being suitable for providing a suitable path of reduced electrical resistivity (path of least electrical resistance) through the otherwise electrically resistive rubber composition (e.g. tire tread or tire sidewall, for example) to retard or reduce electrostatic buildup in a tire component with resorting to providing a path of least electrical resistance through or around the tire component by insertion of an electrically conductive element through or around the tire component (e.g. tread) such as, for example an electrically conductive rubber strip which may also, or alternatively, provide a significant physical property improvement for the rubber composition itself.

For example, the tread portion with the tread running surface may be comprised of such ionic compound-containing rubber composition.

Alternatively, such tire tread may be comprised of a plurality of circumferential zones (a zoned tire tread) where one or more of such circumferential tread zones is comprised of said ionic material-containing rubber composition.

In the practice of this invention the rubber composition, particularly said tire component rubber composition and particularly said tire tread rubber composition, contains reinforcement comprised of particulate reinforcement as precipitated silica (synthetic amorphous silica) and may also contain rubber reinforcing carbon black.

For example, and as hereinbefore discussed, said tread rubber composition may contain from about 15 to about 120 phr of particulate reinforcement comprised of:

(A) about 15 to about 120 phr of precipitated silica or (B) a combination of precipitated silica and said rubber reinforcing carbon black containing up to 25 phr of rubber reinforcing carbon black.

In practice, the rubber tire tread may optionally be of a cap/base construction comprised of an outer rubber tread cap layer with the tread running surface and an underlying rubber tread base layer. Such tread construction is well known to those having skill in such art. It is contemplated that said outer rubber tread cap layer is the comprised of the aforesaid rubber composition containing the ionic liquid, although the tread base rubber composition may be comprised of the rubber composition independently of the tread rubber cap layer.

In one embodiment of the invention, as hereinbefore discussed, a tire is provided having a circumferential tread comprised of the rubber composition containing the inclusion of said ionic compound, wherein said tread is exclusive of an electrically conductive rubber strip extending through or around said tread to its running surface.

Accordingly, an embodiment of the invention is provided where a tire having a circumferential tread comprised of such rubber composition is exclusive of an electrically conductive rubber strip which contains at least 35 phr of rubber reinforcing carbon black which extends through or around said tread to its running surface.

As hereinbefore discussed, in a further practice of the invention, said tire may be provided with a running surface of its tread containing at least two parallel positioned circumferential tread zones wherein the rubber composition of at least one of said tread zones is said rubber composition which contains said ionic compound. In such practice, at least one of said tread zones may be of a rubber composition which is exclusive of a ionic compound.

As hereinbefore discussed, historically, the ionic compounds, or liquids, themselves encompass a wide range of compounds, or liquids, composed of both an organic cation and an organic or inorganic anion within their composition. As previously mentioned, preferably the ionic compounds for the rubber composition are desirably ionically conductive.

In general, it is understood that the ionic compounds are in the nature of salts (composed of the cation moiety and an anion moiety) that exist in ionic state as distinguished from salts that exist in a dissolved state in an organic solvent or water. Usually one or both of the ions, usually the cation moiety, is particularly large with the cation having a low degree of symmetry. For the purposes of this invention they may sometimes exist a liquid well below room temperature (e.g. well below 23° C.) although it may be desired that they are more in a nature of a solid or semi-solid at room temperature with a melting point of up to 150° C. or even up to, 200° C., and preferably below a somewhat normal mixing temperature of rubber in a range of from about 150° C. to about 180° C.

Exemplary of ionic compounds, which are preferably ionically conductive compounds, are those comprised of the aforesaid cation (M+) moiety and an anion (A−) moiety.

Representative examples of many of various anions for said ionic compound, for example, and not intended to be exhaustive or limiting, as taken from a list of ionic compounds published by Sigma-Aldrich Chemicals are, for example, 2-(2-methoxyethoxy)-ethylsulfate; acetate; benzoate; bis(2,4,4,-trimethyl-pentyl) phosphinate; bis(pentafluoroethylsulfonyl) imide; bis(trifluoromethylsulfonyl imide; bromide; chloride; alpha-cyano-4-hydroxycinnamate;

decanoate; dicyanamide; ethylsulfate; hexafluoroantimonate; hexafluorophosphate; hydrogensulfate; iodide; methanesulfonate; methylsulfate; nitrate; nonafluoro-butanesulfonate; heptadecafluoro-octanesulfonate; octylsulfate; butane-1-sulfonate; propane-1-sulfonate; tetrachloroaluminate; tetrafluoroborate; thiocyanate; thiosalicylate; tosylate; trifluoroacetate; trifluoromethanesulfonate; and tris (trifluoromethylsulfonyl) methide.

Further, and in one embodiment, an anion moiety for said ionic liquid is selected from ethyl sulfate, chloride, acetate, hydrogen sulfate and tetracholoro aluminate.

Representative examples of various organic cation moieties for said ionic compound are, for example and not intended to be exhaustive or limiting, also taken from a list of ionic compounds published by *Sigma-Aldrich Chemical* are those which contain moieties comprised of phosphonium; imidazolium; pyrrolidinium; pyridinium; piperidinium; or ammonium moiety For example, and not intended to be exhaustive or limiting, such cation moieties are mentioned as being:

(A) phosphonium moiety-containing materials comprised of trihexyl-tetradecyl-phosphonium, tetrabutyl-phosphonium, tetraoctyl-phosphonium, tributyl-hexacecyl-phosphonium, and other phosphonium moiety containing organic materials;

(B) imidazolium moiety-containing materials comprised of 1-butyl-3-methyl-imidazolium, 1,2-dimethyl-3-propyl-imidazolium, 1-ethyl-3-methyl-imidazolium, 1-allyl-3-methyl-imidazolium, 1-butyl-2,3-dimethyl-imidazolium, 1-butyl-3-methyl-imidazolium, 1-butyl-4-methyl-imidazolium, 1-ethyl-2,3-dimethyl-imidazolium, 1-ethyl-3-methyl-imidazolium, 1-hexyl-3-methyl-imidazolium, 1-methyl-3-octyl-imidazonium, 1-benzyl-3-methyl-imidazonium, and other imidazolium moiety containing organic materials.

(C) pyrrolidinium moiety-containing materials comprised of 1-ethyl-3-methyl-pyrrolidinium, butyl-1-methyl-pyrrolidinium, and other pyrrolidinium moiety containing materials.

(D) pyridinium moiety-containing materials comprised of 1-butyl-3-methyl-pyridinium, 3-methyl-1-propoyl-pyridinium, 1-butyl-pyridinium, 4-methyl-N-butyl-pyridinium, and other pyridinium moiety containing materials.

(E) ammonium moiety-containing materials comprised of tetrabutyl-ammonium, methyl-trioctyl-ammonium, tetraheptyl-ammonium, tetrahexyl-ammonium, tetraoctyl-ammonium, tetrapentyl-ammonium, and other ammonium moiety containing materials.

In practice, it is envisioned that the ionic compound may be comprised of a combination of such mentioned anionic moiety and such mentioned cationic moiety.

In a further embodiment, for example, such ionic compound may be comprised of, for example 1-ethyl-3-methylimidazonium ethyl sulfate, 1-butyl-3-methylimidazolium chloride, 1-butyl-3-methylimidazolium acetate, 1-butyl-3-methylimidazolium hydrogen sulfate or 1-butyl-3-methylimidazolium tetrachloro aluminate.

It is recognized that such ionic compounds have various degrees of ionic conductivity which can readily evaluated in the rubber composition (e.g. tire component rubber component such as for example a tire tread or sidewall component) without undue experimentation and thereby chosen depending somewhat upon the individual rubber composition (e.g. tire component such as for example tire tread rubber composition), including the electrical resistivity (conductivity) of the rubber composition without the inclusion of the ionic compound, as well as a desired electrical conductivity of the rubber composition and intended its intended use (e.g. use of the tire).

In practice, and as hereinbefore discussed, the rubber composition (e.g. rubber composition for a tire component) may desirably contain from about 15 to about 120 phr reinforcing filler comprised of from about 5 to about 25 phr of rubber reinforcing carbon black and from about 25 to about 115 phr of amorphous, precipitated silica, together with a coupling agent for said precipitated silica having a moiety reactive with hydroxyl groups (e.g. silanol groups) contained on said precipitated silica and an other different moiety interactive with said conjugated diene-based elastomer(s).

Representative of such coupling agents are, for example, and not intended to be limiting are, for example, bis(3-alkoxysilylalkyl) polysulfides having an average in a range of from 2 to about 4, which may be preferably an average of from 2 to about 2.6, connecting sulfur atoms in its polysulfidic bridge such as, for example, a bis(3-ethoxysilylpropyl) polysulfide.

Further examples of various of such coupling agents are, for example, alkoxyorganomercaptosilanes, which description is intended herein to include alkoxyorganomercaptosilanes in which its mercapto moiety is capped.

In the practice of this invention, as hereinbefore pointed out, the rubber composition is comprised of at least one diene-based rubber, or elastomer. Suitable conjugated dienes are isoprene and 1,3-butadiene and suitable vinyl aromatic compounds are styrene and alpha methyl styrene, particularly styrene. Thus, it is considered that the elastomer is a sulfur curable elastomer.

Such diene based rubber, or elastomer, may be selected from, for example, polymers and copolyomers of at least one of cis 1,4-polyisoprene and 1,3-butadiene and copolymers of styrene (and optionally alpha methyl styrene) with at least one of isoprene and 1,3-butadiene.

Such diene-based rubber may be comprised of at least one of cis 1,4-polyisoprene rubber (natural and/or synthetic rubber and usually preferably natural rubber), styrene/butadiene rubber (e.g. emulsion polymerization prepared styrene/butadiene copolymer rubber and/or, organic solution polymerization prepared styrene/butadiene rubber), cis 1,4-polybutadiene rubber, isoprene/butadiene rubber, styrene/isoprene/butadiene terpolymer rubbers, vinyl polybutadiene rubber (containing from about 35 to about 80 percent vinyl 1,2-units), styrene/isoprene copolymers, styrene/butadiene/acrylonitrile terpolymer rubber, butadiene/acrylonitrile copolymer rubber and 3,4-polyisoprene rubber.

It is readily understood by those having skill in the art that the rubber composition of the aforesaid tire tread may be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, and plasticizers, fillers, pigments, fatty acid, zinc oxide, waxes, antioxidants and antiozonants. As known to those skilled in the art, depending on the intended use of the sulfur vulcanizable and sulfur vulcanized material (rubbers), the additives mentioned above, where used, may be selected and used in conventional amounts.

Typical amounts of tackifier resins, if used, may comprise for example about 0.5 to about 10 phr, usually about 1 to about 5 phr. Typical amounts of processing aids if used may for example comprise 1 to 20 phr. Typical amounts of antioxidants may comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346.

Typical amounts of antiozonants comprise about 1 to about 5 phr. Typical amounts of fatty acids, if used, which can include stearic acid may for example comprise about 0.5 to about 3 phr. Typical amounts of zinc oxide may comprise for example about 2 to about 6 phr. Typical amounts of waxes, if used, may comprise for example about 1 to about 5 phr. Microcrystalline waxes might used. Typical amounts of peptizers, if used, may comprise for example about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from, for example, about 0.5 to about 4 phr, with a range of from about 0.5 to about 2.2 often being desired.

Accelerators are used to control the time and/or temperature required for vulcanization and to improve the properties of the vulcanizate. For example, a single accelerator system may be used, i.e., primary accelerator. Conventionally, a primary accelerator may be used, for example, in an amounts ranging from about 0.5 to about 2.0 phr. Alternately combinations of two or more accelerators might be used which the primary accelerator is generally used in the larger amount (0.5 to 2 phr), and a secondary accelerator which is generally used in smaller amounts (0.05 to 0.50 phr) in order to activate and to improve the properties of the vulcanized rubber. Representative types of accelerators might be, for example, disulfide, guanidine, thiuram, and sulfenamide based sulfur vulcanization accelerators. Preferably, the primary accelerator is a sulfenamide. If a second accelerator is used, the secondary accelerator is preferably a guanidine, dithiocarbamate or thiuram based compound. The presence and relative amounts of sulfur vulcanizing agent and accelerator(s) are not considered to be an aspect of this invention unless otherwise indicated.

Sometimes one or more of the antioxidants and antiozonants may be more simply referred to as antidegradants.

The tire can be built, shaped, molded and cured by various methods which will be readily apparent to those having skill in such art.

The prepared tire of this invention is conventionally shaped and cured by methods known to those having skill in such art.

EXAMPLE I

Sulfur vulcanizable rubber mixtures containing silica reinforcement and coupling agent were prepared as rubber Samples A through J. Samples A and B were Control Samples. Samples C through J contained an inclusion of ionic compounds individually comprised of an organic cation moiety and an anion moiety.

The rubber compositions were prepared by mixing the elastomers(s) together with compounding ingredients in a first non-productive mixing stage (NP-1) in an internal rubber mixer for about 5 minutes to a temperature of about 160° C. The rubber mixture is then mixed in a second non-productive mixing stage (NP-2) in an internal rubber mixer for about 3 minutes to a temperature of about 160° C. where one or more ingredients may be optionally added, if desired. The resulting rubber mixture is then mixed in a productive mixing stage (PR) in an internal rubber mixer with sulfur curatives for about 3 minutes to a temperature of about 110° C. The rubber composition is sheeted out and cooled to below 40° C. between each of the non-productive mixing steps and prior to the productive mixing step.

The basic rubber composition formulation for the respective Samples is presented in Table 1 and the ingredients are expressed in terms of weight, namely parts by weight (phr) unless otherwise indicated.

TABLE 1

| | Parts | | |
|---|---|---|---|
| | Sample A | Sample B | Samples C-J |
| Non-Productive Mixing (NP-1) | | | |
| Natural cis 1,4-polyisoprene rubber[1] | 100 | 100 | 100 |
| Carbon black[2] | 30 | 0 | 0 |
| Precipitated silica[3] | 0 | 27.5 | 27.5 |
| Coupling agent composite (50 parts by weight coupling agent, 50 parts carbon black)[4] | 0 | 4.4 | 4.4 |
| Zinc oxide | 3 | 3 | 3 |
| Fatty Acid (stearic acid)[5] | 2 | 2 | 2 |
| Ionic compound (liquid)[6] | 0 | 0 | (variable) |
| Non-Productive Mixing (NP-2) | | | |
| Carbon black | 20 | 0 | 0 |
| Precipitated silica[3] | 0 | 27.5 | 27.5 |
| Coupling agent composite (50 parts by weight coupling agent, 50 parts carbon black)[4] | 0 | 4.4 | 4.4 |
| Productive Mixing (PR) | | | |
| Sulfur | 1 | 1.9 | 1.9 |
| Accelerator(s)[7] | 1.5 | 2.3 | 2.3 |

[1]Natural cis 1,4-polyisoprene rubber as TSR20

[2]N120 rubber reinforcing carbon black, an ASTM designation

[3]Precipitated silica as 1165MP ™ from Rhodia

[4]Coupling agent composite as X266S ™ from Degussa blended with carbon black in a 50/50 weight ratio, with the coupling agent comprised of a bis(3-triethoxysilylpropyl) polysulfide having a average in a range of from about 2 to about 2.6 connecting sulfur atoms in its polysulfidic bridge and reported in Table 1 in terms of the composite.

[5]Fatty acid comprised primarily (at least 50 weight percent) of stearic acid and a minor amount of other fatty acids including palmitic and oleic acids

[6]Various ionic liquids from Sigma-Aldrich

[7]Sulfenamide and guanidine based sulfur cure accelerators

The following Table 2 (divided into Table 2 and Table 2 Cont.) reports cure behavior and various physical properties of rubber Samples A through J, of which Samples C through J contain the various ionic liquids, expressed in terms of weight (phr) and weight percent unless otherwise indicated. Where a cured rubber sample was evaluated, such as for the stress-strain, rebound, hardness, tear strength and abrasion measurements, the rubber sample was cured for about 32 minutes at a temperature of about 150° C.

TABLE 2

| | Samples (phr) | | | | |
|---|---|---|---|---|---|
| | Control A | Control B | C | D | E |
| Ionic liquids for Samples C-J | | | | | |
| No ionic liquid | 0 | 0 | — | — | — |
| Ionic liquid as 1-ethyl-3-methylimidazonium ethyl sulfate | 0 | 0 | 1 | 0 | 0 |
| Ionic liquid as 1-ethyl-3-methylimidazonium ethyl sulfate | 0 | 0 | 0 | 3 | 0 |
| Ionic liquid as 1-ethyl-3-methylimidazonium ethyl sulfate | 0 | 0 | 0 | 0 | 5 |
| Ionic liquid as 1-ethyl-3-methylimidazonium ethyl sulfate | 0 | 0 | 0 | 0 | 0 |
| Ionic liquid as 1-butyl-3-methylimidazolium chloride | 0 | 0 | 0 | 0 | 0 |
| Ionic liquid as 1-butyl-3-methylimidazonium acetate | 0 | 0 | 0 | 0 | 0 |
| Ionic liquid as 1-butyl-3-methylimidazolium hydrogen sulfate | 0 | 0 | 0 | 0 | 0 |
| Ionic liquid as1-butyl-3-methylimidazolium tetrachloro aluminate | 0 | 0 | 0 | 0 | 0 |
| RPA, 100° C., 1 Hz[1] Storage modulus G' | | | | | |
| Uncured, KPa (100° C., 0.83 Hz, 15% strain) | 165 | 280 | 289 | 284 | 310 |
| Cured, 1% strain, KPa | 2258 | 3485 | 3974 | 3889 | 4022 |
| Cured, 10% strain, KPa | 1252 | 2075 | 2476 | 2598 | 2739 |
| Tan delta at 1% strain | 0.12 | 0.10 | 0.09 | 0.06 | 0.05 |
| Tan delta at 5% strain | 0.15 | 0.11 | 0.10 | 0.08 | 0.07 |
| Tan delta at 10% strain | 0.15 | 0.12 | 0.12 | 0.10 | 0.10 |
| Tan delta at 15% strain | 0.12 | 0.13 | 0.17 | 0.20 | 0.19 |
| Tan delta at 50% strain | 0.153 | 0.123 | 0.115 | 0.101 | 0.095 |
| Stress-strain (ATS)[2] | | | | | |
| Tensile strength (MPa) | 20 | 19.6 | 22.1 | 22.9 | 24.5 |
| Elongation at break (%) | 507 | 548 | 535 | 527 | 546 |
| 100% modulus (MPa) | 1.4 | 1.6 | 2.1 | 2.4 | 2.5 |
| 300% modulus (MPa) | 9.4 | 8.6 | 11 | 11.8 | 12.3 |
| Hardness (Shore A), room temp | 63 | 70 | 73 | 76 | 76 |
| Rebound, 100° C. | 55 | 57 | 60 | 61 | 64 |
| Volume resistivity (ohm/cm)[3] | $9.2 \times 10^5$ | $4.5 \times 10^{14}$ | $2 \times 10^{14}$ | $1.3 \times 10^{13}$ | $2.8 \times 10^{11}$ |

| | Samples (phr) | | | | |
|---|---|---|---|---|---|
| | Control F | Control G | H | I | J |
| Ionic liquids for Samples C-J | | | | | |
| No ionic liquid | — | — | — | — | — |
| Ionic liquid as 1-ethyl-3-methylimidazonium ethyl sulfate | 0 | 0 | 0 | 0 | 0 |
| Ionic liquid as 1-ethyl-3-methylimidazonium ethyl sulfate | 0 | 0 | 0 | 0 | 0 |
| Ionic liquid as 1-ethyl-3-methylimidazonium ethyl sulfate | 0 | 0 | 0 | 0 | 0 |
| Ionic liquid as 1-ethyl-3-methylimidazonium ethyl sulfate | 8 | 0 | 0 | 0 | 0 |
| Ionic liquid as 1-butyl-3-methylimidazolium chloride | 0 | 5 | 0 | 0 | 0 |
| Ionic liquid as1-butyl-3-methylimidazolium acetate | 0 | 0 | 5 | 0 | 0 |
| Ionic liquid as1-butyl-3-methylimidazolium hydrogen sulfate | 0 | 0 | 0 | 5 | 0 |
| Ionic liquid as1-butyl-3-methylimidazolium tetrachloro aluminate | 0 | 0 | 0 | 0 | 5 |
| RPA, 100° C., 1 Hz[1] Storage modulus G' | | | | | |
| Uncured, KPa (100° C., 0.83 Hz, 15% strain) | 320 | 234 | 236 | 233 | 330 |
| Cured, 1% strain, KPa | 3857 | 3241 | 3576 | 4803 | 3076 |
| Cured, 10% strain, KPa | 2649 | 2219 | 2293 | 2680 | 2311 |
| Tan delta at 1% strain | 0.05 | 0.08 | 0.09 | 0.10 | 0.11 |
| Tan delta at 5% strain | 0.07 | 0.09 | 0.10 | 0.13 | 0.13 |
| Tan delta at 10% strain | 0.09 | 0.11 | 0.11 | 0.15 | 0.15 |
| Tan delta at 15% strain | 0.22 | 0.19 | 0.20 | 0.15 | 0.24 |
| Tan delta at 50% strain | 0.28 | 0.37 | 0.30 | 0.19 | 0.43 |

TABLE 2-continued

Stress-strain (ATS)[2]

| | | | | | |
|---|---|---|---|---|---|
| Tensile strength (MPa) | 23.9 | 22.6 | 23 | 23.4 | 20.9 |
| Elongation at break (%) | 542 | 502 | 504 | 506 | 478 |
| 100% modulus (MPa) | 2.5 | 2.2 | 2.2 | 2.7 | 2.1 |
| 300% modulus (MPa) | 11.9 | 12.5 | 12.9 | 13.6 | 9.4 |
| Hardness (Shore A), room temp | 76 | 74 | 73 | 81 | 78 |
| Rebound, 100° C. | 65 | 63 | 63 | 55 | 51 |
| Volume resistivity (ohm/cm)[3] | $4.8 \times 10^{10}$ | $2.8 \times 10^{12}$ | $7.8 \times 10^{12}$ | $2.3 \times 10^{13}$ | $1.8 \times 10^{13}$ |

[1]Data according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber &Plastics News, Apr. 26 and May 10, 1993.
[2]Data according to Automated Testing System (ATS) instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Volume resistivity (ohm/cm) as a measure of electrical resistivity, (and considered herein to be a measure of electrical resistance of a rubber composition, or a consideration of its electrical conductivity) according to ASTM D257.

From Table 2 it can be seen that the volume resistivity of Samples C through J was reduced significantly as compared to Control Samples A and B having volume resistivities of $9.2 \times 10^5$ and $4.5 \times 10^{14}$ ohm/cm, respectively.

This is considered herein to be significant in the sense of enabling the volume resistivity of the high volume resistivity rubber compositions to be substantially reduced for the silica-reinforced rubber compounds containing the relatively minor rubber reinforcing carbon black content of less than 25 phr thereof (therefore containing a significant amount of precipitated silica reinforcement). It is considered herein that a tire tread composed of the rubber compositions C through J would have an improved electrical conductivity (sufficiently low, or reduced, electrical volume resistivity in a sense of sufficiently low electrical resistance) to provide a path of suitable electrical conductivity through the tire tread to its running surface (e.g. to the ground).

While, as hereinbefore discussed, the mechanism may not be completely understood, it is envisioned that the ionic compounds in Samples C through J are ionically conductive ionic compounds which permit a migration of electrical potential generated ions within the ionic compound from one electrical potential to the other electrical potential for the respective Sample.

From Table 2 it can also be seen that the tan delta physical property values of the Samples C through J, used the inclusion of the ionic liquids, were lower than those of the Control Samples A and B at the 10 percent or lower strain level and were higher than those of the Control Samples A and B at higher strain values.

This is considered herein to be significant in a sense of showing an improvement in such dynamic physical property which is apparently promoted by the inclusion of the ionic compound in the respective Sample, namely, the lower strain tan delta values promoting predictive lower rolling resistance for a tire having a tread of the rubber compositions of Samples C through J and the higher strain tan delta values promoting predictive better traction and handling (e.g. cornering or braking) for a tire having a tread of such rubber compositions.

From Table 2 it can further be seen that higher ultimate tensile strength and higher hardness (Shore A hardness) values were observed for the ionic liquid-containing Samples C through J which is further considered herein to be an additional significant result of the inclusion of the ionic liquids in the rubber compositions. This is considered herein to be significant in a sense of showing an improvement in such mechanical (physical) property, namely a better predictive durability, by the inclusion of the ionic compound in the respective rubber Sample.

From Table 2 it can additionally be seen that the hot rebound values (100° C.) Samples C through J were higher which is considered herein to be significant in a sense that it indicated that the rubber compositions of Samples C through J were less hysteretic (lower energy loss) and are predictive promoting lower rolling resistance for a tire having a tread of such rubber compositions and hence a better fuel economy for an associated vehicles with such tires, apparently as a result of inclusion of the ionic compound in the respective rubber Sample.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component as a rubber composition comprised of, based upon parts by weight per 100 parts by weight rubber (phr):
   (A) at least one conjugated diene-based rubber;
   (B) about 15 to about 120 phr of particulate reinforcement comprised of precipitated silica or a combination of precipitated silica and up to about 25 phr of rubber reinforcing carbon black, and
   (C) from about 1 to about 15 phr of an ionically conductive compound comprised of an ionic salt having a cation moiety and an anion moiety;
   wherein said tire component is selected from at least one of a circumferential tire tread and a tire sidewall;
   wherein for said ionic compound:
   (D) said anion moiety is selected from 2-(2-methoxy-ethoxy)-ethylsulfate, acetate, benzoate, bis(2,4,4, -trimethyl-pentyl) phosphinate, bis(pentafluoroethylsulfonyl) imide, bis(trifluormethylsulfonyl) imide, alpha-cyano-4-hydroxycinnamate, decanoate, dicyanamide, ethylsulfate, hexafluoroantimonate, hexafluorophosphate, hydrogensulfate, iodide, methanesulfonate, methylsulfate, nitrate, nonafluoro-butanesulfonate, heptadecafluoro-octanesulfonate, octylsulfate, butane-1-sulfonate, propane-1-sulfonate, tetrachloroaluminate, tetrafluoroborate, thiocyanate, thiosalicylate, tosylate, trifluoroacetate, trifluoromethanesulfonate, or tris(trifluoromethylsulfonyl) methide, and said cation moiety is selected from trihexyl-tetradecyl-phosphonium, tetrabutyl-phosphonium, tetraoctyl-phosphonium, tributyl-hexacecyl-phosphonium, 1-butyl-3-methyl-imidazolium, 1,2-dimethyl-3-propyl-imidazolium, 1-ethyl-3-methyl-imidazolium, 1-allyl-3-methyl-imidazolium, 1-butyl-2,3-dimethyl-imidazolium, 1-butyl-3-methyl-imidazolium, 1-butyl-4-methyl-imidazolium, 1-ethyl-2,3-dimethyl-imidazolium, 1-ethyl-3-methyl-imidazolium, 1-hexyl-3-methyl-imidazolium, 1-methyl-3-octyl-imidazonium, 1-benzyl-3-methyl-imidazonium, 1-ethyl-3-methyl-pyrrolidinium, butyl-1-methyl-pyrrolidinium, 1-butyl-3-methyl-pyridinium, 3-methyl-1-propyl-pyridinium, 1-butyl-pyridinium, or 4-methyl-N-butyl-pyridinium, or (E) said anion moiety is comprised of 2-(2-methoxy-ethoxy)-ethylsulfate, acetate, benzoate, bis(2,4,4,-trimethyl-pentyl) phosphinate, bis(pentafluoroethylsulfonyl) imide, bis(trifluormethylsulfonyl) imide, alpha-cyano-4-hydroxycinnamate, decanoate, dicyanamide, hexafluoroantimonate, hexafluorophosphate, hydrogensulfate, methanesulfonate, nitrate, nonafluoro-butanesulfonate, heptadecafluoro-octanesulfonate, octylsulfate, butane-1-sulfonate, propane-1-sulfonate, tetrachloroaluminate, tetrafluoroborate, thiocyanate, thiosalicylate, tosylate, trifluoroacetate, trifluoromethanesulfonate, or tris(trifluoromethylsulfonyl) methide, and said cation moiety is selected from trihexyl-tetradecyl-phosphonium, tetrabutyl-phosphonium, tetraoctyl-phosphonium, tributyl-hexacecyl-phosphonium, 1-butyl-3-methyl-imidazolium, 1,2-dimethyl-3-propyl-imidazolium, 1-ethyl-3-methyl-imidazolium, 1-allyl-3-methyl-imidazolium, 1-butyl-2,3-dimethyl-imidazolium, 1-butyl-3-methyl-imidazolium, 1-butyl-4-methyl-imidazolium, 1-ethyl-2,3-dimethyl-imidazolium, 1-ethyl-3-methyl-imidazolium, 1-hexyl-3-methyl-imidazolium, 1-methyl-3-octyl-imidazonium, 1-benzyl-3-methyl-imidazonium, 1-ethyl-3-methyl-pyrrolidinium, butyl-1-methyl-pyrrolidinium, tetrabutyl-ammonium, methyl-trioctyl-ammonium, tetraheptyl-ammonium, tetrahexyl-ammonium, tetraoctyl-ammonium, tetrapentyl-ammonium, 1-butyl-3-methyl-pyridinium, 3-methyl-1-propyl-pyridinium, 1-butyl-pyridinium, or 4-methyl-N-butyl-pyridinium.

2. The tire of claim 1 wherein, for said ionic compound: said anion moiety is comprised of 2-(2-methoxyethoxy)-ethylsulfate, acetate, benzoate, bis(2,4,4,-trimethyl-pentyl) phosphinate, bis(pentafluoroethylsulfonyl) imide, bis(trifluormethylsulfonyl) imide, alpha-cyano-4-hydroxycinnamate, decanoate, dicyanamide, ethylsulfate, hexafluoroantimonate, hexafluorophosphate, hydrogensulfate, iodide, methanesulfonate, methylsulfate, nitrate, nonafluoro-butanesulfonate, heptadecafluoro-octanesulfonate, octylsulfate, butane-1-sulfonate, propane-1-sulfonate, tetrachloroaluminate, tetrafluoroborate, thiocyanate, thiosalicylate, tosylate, trifluoroacetate, trifluoromethanesulfonate, or tris(trifluoromethylsulfonyl) methide, and said cation moiety is selected from trihexyl-tetradecyl-phosphonium, tetrabutyl-phosphonium, tetraoctyl-phosphonium, tributyl-hexacecyl-phosphonium, 1-butyl-3-methyl-imidazolium, 1,2-dimethyl-3-propyl-imidazolium, 1-ethyl-3-methyl-imidazolium, 1-allyl-3-methyl-imidazolium, 1-butyl-2,3-dimethyl-imidazolium, 1-butyl-3-methyl-imidazolium, 1-butyl-4-methyl-imidazolium, 1-ethyl-2,3-dimethyl-imidazolium, 1-ethyl-3-methyl-imidazolium, 1-hexyl-3-methyl-imidazolium, 1-methyl-3-octyl-imidazonium, 1-benzyl-3-methyl-imidazonium, 1-ethyl-3-methyl-pyrrolidinium, butyl-1-methyl-pyrrolidinium, 1-butyl-3-methyl-pyridinium, 3-methyl-1-propyl-pyridinium, 1-butyl-pyridinium, or 4-methyl-N-butyl-pyridinium.

3. The tire of claim 1 wherein for said ionic compound:
said anion moiety is comprised of 2-(2-methoxyethoxy)-ethylsulfate, acetate, benzoate, bis(2,4,4,-trimethyl-pentyl) phosphinate, bis(pentafluoroethylsulfonyl) imide, bis(trifluormethylsulfonyl) imide, alpha-cyano-4-hydroxycinnamate, decanoate, dicyanamide, ethylsulfate, hexafluoroantimonate, hexafluorophosphate, hydrogensulfate, methane sulfonate, nitrate, nonafluoro-butanesulfonate, heptadecafluoro-octanesulfonate, octylsulfate, butane-1-sulfonate, propane-1-sulfonate, tetrachloroaluminate, tetrafluoroborate, thiocyanate, thiosalicylate, tosylate, trifluoroacetate, trifluoromethanesulfonate, or tris(trifluoromethylsulfonyl) methide, and said cation moiety is selected from trihexyl-tetradecyl-phosphonium, tetrabutyl-phosphonium, tetraoctyl-phosphonium, tributyl-hexacecyl-phosphonium, 1-butyl-3-methyl-imidazolium, 1,2-dimethyl-3-propyl-imidazolium, 1-ethyl-3-methyl-imidazolium, 1-allyl-3-methyl-imidazolium, 1-butyl-2,3-dimethyl-imidazolium, 1-butyl-3-methyl-imidazolium, 1-butyl-4-methyl-imidazolium, 1-ethyl-2,3-dimethyl-imidazolium, 1-ethyl-3-methyl-imidazolium, 1-hexyl-3-methyl-imidazolium, 1-methyl-3-octyl-imidazonium, 1-benzyl-3-methyl-imidazonium, 1-ethyl-3-methyl-pyrrolidinium, butyl-1-methyl-pyrrolidinium, tetrabutyl-ammonium, methyl-trioctyl-ammonium, tetraheptyl-ammonium, tetrahexyl-ammonium, tetraoctyl-ammonium, tetrapentyl-ammonium, 1-butyl-3-methyl-pyridinium, 3-methyl-1-propyl-pyridinium, 1-butyl-pyridinium, or 4-methyl-N-butyl-pyridinium.

4. The tire of claim 1 wherein said ionic compound is comprised of 1-ethyl-3-methylimidazonium ethyl sulfate, 1-butyl-3-methylimidazolium chloride, 1-butyl-3-methylimidazonium acetate, 1-butyl-3-methylimidazonium hydrogen sulfate, or 1-butyl-3-methylimidazonium tetrachloro aluminate.

5. The tire of claim 1 wherein said component is a sidewall.

6. The tire of claim 1 wherein said component is a circumferential tread, wherein said tread is exclusive of an electrically conductive rubber strip extending through or around said tread to its running surface.

7. The tire of claim 1, wherein said component is a circumferential rubber tread which provides a path of least electrical resistance to its running surface by inclusion in the tread rubber composition of said ionic compound.

8. The tire of claim 1 wherein said component is a circumferential tread, wherein the running surface of said tread contains at least two parallel positioned circumferential tread zones wherein at least one of said tread zones is comprised of said rubber composition.

9. The tire of claim 8 wherein at least one of said tread zones is comprised of a rubber composition exclusive of an ionic compound comprised of said ionic salt.

* * * * *